US009961103B2

(12) United States Patent
Williams et al.

(10) Patent No.: US 9,961,103 B2
(45) Date of Patent: May 1, 2018

(54) INTERCEPTING, DECRYPTING AND INSPECTING TRAFFIC OVER AN ENCRYPTED CHANNEL

(71) Applicant: International Business Machines Corporation, Armonk, NY (US)

(72) Inventors: Ronald Becker Williams, Austin, TX (US); Paul Coccoli, Marietta, GA (US); John William Court, Carrara (AU); Gregory Lyle Galloway, Cumming, GA (US); Matthew Joseph Kubilus, Marietta, GA (US); Steven Ashley Mazur, Johns Creek, GA (US); Joseph Karl Vossen, Duluth, GA (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 14/526,215

(22) Filed: Oct. 28, 2014

(65) Prior Publication Data
US 2016/0119374 A1 Apr. 28, 2016

(51) Int. Cl.
*H04L 9/32* (2006.01)
*H04L 29/06* (2006.01)

(52) U.S. Cl.
CPC ........ *H04L 63/1441* (2013.01); *H04L 9/3263* (2013.01); *H04L 63/04* (2013.01);
(Continued)

(58) Field of Classification Search
CPC . H04L 63/14; H04L 63/1408; H04L 63/1441; H04L 63/1466; H04L 63/04;
(Continued)

(56) References Cited

U.S. PATENT DOCUMENTS 8,214,635 B2 7/2012 Wang et al.
8,312,308 B2 11/2012 Kanekar
(Continued)

FOREIGN PATENT DOCUMENTS

EP        2337304 B1      11/2012
WO    WO2007134082 A2    11/2007
WO    WO2013068033 A1     5/2013

OTHER PUBLICATIONS

Tempongko, et al, "DB2 10 for z/OS: Configuring SSL for Secure Client-Server Communications," IBM, 2011.
(Continued)

*Primary Examiner* — Trong Nguyen
(74) *Attorney, Agent, or Firm* — Jeffrey S. LaBaw; David H. Judson

(57) ABSTRACT

A network-based appliance includes a mechanism to intercept, decrypt and inspect secure network traffic flowing over SSL/TLS between a client and a server. The mechanism responds to detection of a session initiation request message from the client, the message being received following establishment of a TCP connection between the client and server. The mechanism responds by holding the session initiation request message, preferably by creating a fake socket to a local process, and then diverting the request message over that socket. The TCP connection is then terminated, and the mechanism initiates a new session in initiation request message, all while the original session initiation request message continues to be held. The server responds with its server certificate, which is then used by the mechanism to generate a new server certificate. The new server certificate is then returned to the requesting client as the response to the session initiation request message.

25 Claims, 7 Drawing Sheets

(52) U.S. Cl.
CPC ...... *H04L 63/0428* (2013.01); *H04L 63/0823* (2013.01); *H04L 63/166* (2013.01)

(58) Field of Classification Search
CPC ............. H04L 29/06965; H04L 63/166; H04L 9/3263; H04L 63/0823; H04L 63/0428
See application file for complete search history.

(56) References Cited

U.S. PATENT DOCUMENTS

| | | |
|---|---|---|
| 8,402,557 B2 | 3/2013 | Ginter et al. |
| 8,418,241 B2 | 4/2013 | Elzur |
| 2003/0014624 A1* | 1/2003 | Maturana ................ H04L 29/06 713/151 |
| 2004/0015725 A1 | 1/2004 | Boneh et al. |
| 2005/0050362 A1* | 3/2005 | Peles ....................... H04L 63/04 726/4 |
| 2008/0126794 A1 | 5/2008 | Wang et al. |
| 2008/0170561 A1* | 7/2008 | Halbraich ............... H04L 63/00 370/352 |
| 2010/0138910 A1 | 6/2010 | Aldor et al. |
| 2012/0265991 A1 | 10/2012 | Kanekar et al. |
| 2012/0272058 A1 | 10/2012 | Wang et al. |
| 2013/0191627 A1 | 7/2013 | Ylonen et al. |
| 2013/0191630 A1 | 7/2013 | Ylonen et al. |
| 2014/0095865 A1* | 4/2014 | Yerra .................... H04L 9/3265 713/156 |
| 2015/0113264 A1* | 4/2015 | Wang ................. H04L 63/0823 713/151 |

OTHER PUBLICATIONS

Dierks, et al, "The Transport Layer Security (TLS) Protocol Version 1.2, (RFC5246)," IPCOM000173607D, Aug. 1, 2008.

\* cited by examiner

INTERCEPTING, DECRYPTING AND INSPECTING TRAFFIC OVER AN ENCRYPTED CHANNEL

BACKGROUND OF THE INVENTION

Technical Field

This disclosure relates generally to information security on network-connected appliances.

Background of the Related Art

Security threats are continually evolving. With the rapid growth of cutting-edge web applications and increased file sharing, activities that may have been considered harmless in the past could become potential openings for attackers. Traditional security means, such as anti-malware software and firewalls, have become easier to bypass. Thus, there is a significant need for more advanced, proactive threat protection that can help provide comprehensive security against new and emerging threats.

Network-connected, non-display devices ("appliances") are ubiquitous in many computing environments. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. To this end, it is well-known to use such middleware devices to perform computationally-expensive processes related to network security. For example, network intrusion prevention system (IPS) appliances are designed to sit at the entry points to an enterprise network to protect business-critical assets, such as internal networks, servers, endpoints and applications, from malicious threats.

The use of Secure Sockets Layer (SSL) and/or Transport Layer Security (TLS)-based encryption for network communications generally inhibits the ability to identify and mitigate threat traffic from within the network. It is now estimated that upwards of two-thirds or more of all business network traffic is conveyed over SSL/TLS. This means that organizations relying on network communications typically are unable to protect (from the network) the endpoints in their enterprise that may be susceptible to such threats. Indeed, the vast majority of SSL/TLS communications use only server authentication, i.e., the server is authenticated via the SSL/TLS protocols to the client, but the client is unauthenticated with respect to the server. This authentication asymmetry provides the opportunity for a process to interpose itself between client and server in such a way as to enable decryption of communications and inspection of its contents. Such a "man-in-the-middle" (MITM) process may be malicious, or it may be used for legitimate reasons, such as packet inspection (for threat detection).

Thus, it is known to provide a transparent (MITM) proxy between a client and a server that can be configured to create and manage two separate SSL/TLS sessions, one as the client to the target server, and another as a server to the initiating client. The intermediate proxy thus appears to the server as a client, and to the client as the intended server. Communications initiated from the client, and any responses received from the server, theoretically are then available for inspection and subsequent action. Current transparent proxies that operate in this manner, however, are bound to specific Internet Protocol (IP) destination ports and thus have the ability to act only on communications destined specifically for those ports (e.g., port 443 for HTTPS, port 636 for LDAPS, etc.) This requirement limits their effectiveness.

There remains a need to provide for a transparent proxy that can operate legitimately to intercept, decrypt and inspect traffic for any SSL/TLS communication, without regard to the destination port.

BRIEF SUMMARY

A network-based appliance includes a mechanism to intercept, decrypt and inspect secure network traffic flowing over an SSL/TLS secure communication link between a client and a server. The mechanism responds to detection of a session initiation request message from the client, the message being received at the mechanism following establishment of a TCP connection between the client and server. Processing the session initiation request message (in lieu of the first TCP packet) enables the approach of this disclosure to work without regard to the destination port of the intended SSL/TLS communication. In response to detecting the initiation of the SSL/TLS session, the mechanism responds by holding the session initiation request message, preferably by creating a fake socket to a local process, and then diverting (to a local process) the session initiation request message over that socket. The TCP connection is then terminated, and the mechanism initiates (to the server) a brand new SSL/TLS session initiation request message, all while the original session initiation request message continues to be held. The server responds with its server certificate, which (along with other data) is then used by the mechanism to generate a new server certificate, which his otherwise trusted by the client. The new server certificate is then returned to the requesting client as the response to the session initiation request message. In this manner, the system creates and manages two separate SSL/TLS sessions, one as the client to the target server, and the other as the server to the requesting client. Thus, the mechanism appears as a client to the server, and as the intended server to the client. Any communications initiating from the client, and any responses received from the server, pass through the mechanism and are therefore available for inspection (and possibly subsequent action).

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
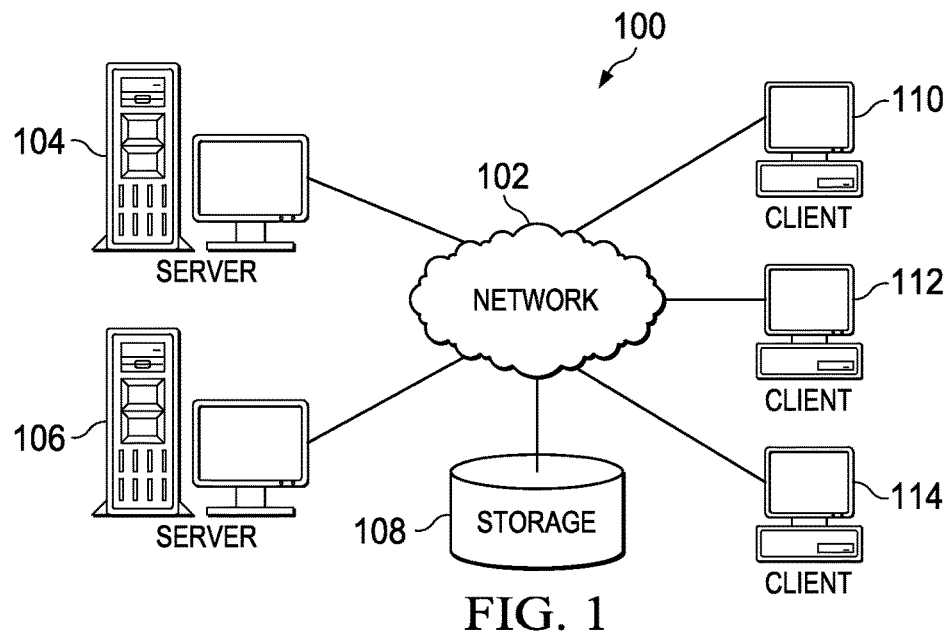
FIG. 1 depicts an exemplary block diagram of a distributed data processing environment in which exemplary aspects of the illustrative embodiments may be implemented.
Figure 2:
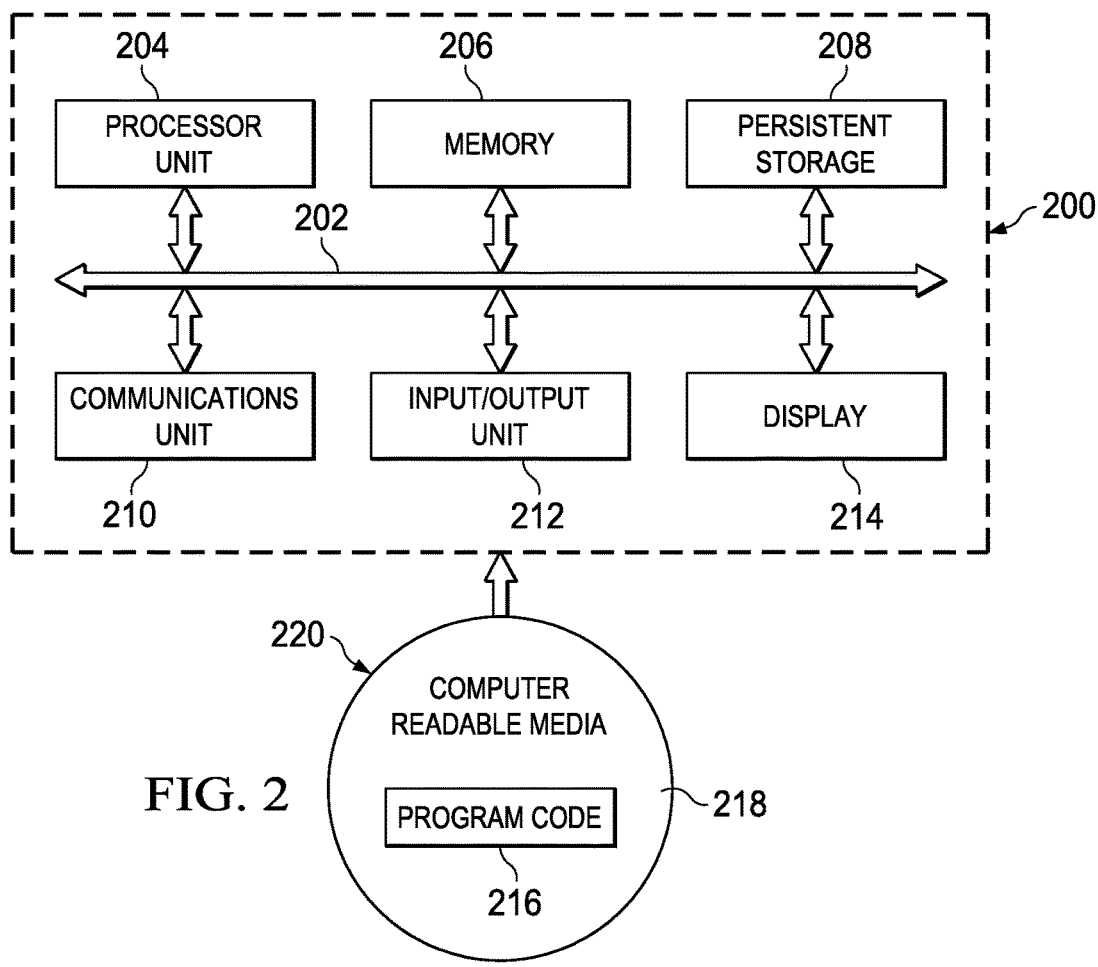
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

As further background, Secure Sockets Layer (SSL) is a well-known cryptographic protocol that is used to secure communications over networks such as the Internet. Cryptographic protocols such as SSL are often based on public key cryptographic systems, such as the RSA (Rivest, Shamir and Adelman) encryption algorithm. For a traditional RSA-based SSL session, the two sides of a connection agree upon a "pre-master secret" (PMS) which is used to generate the parameters for the remainder of the session. Typically, the two sides use RSA asymmetric encryption to establish the pre-master secret without exchanging the actual value in plaintext. In operation, the SSL client generates the pre-master secret and encrypts it with the SSL server's publicly available RSA key. This generates an encrypted pre-master secret (ePMS), which is then provided to the SSL server. The SSL server has a private decryption key, which is then used to decrypt the encrypted pre-master secret. At this point, both the client and the server have the original pre-master secret and can use it to generate the symmetric key used for actual encrypted and secure data exchange.

Encrypted traffic on the web occurs by a chain of trust. Each web server has a certificate that is presents to each client (usually a web browser) to indicate that they are who they say they are. Web servers often get these certificates from an authority (a Certificate Authority, or CA) that can vouch for the legitimacy of the web server. The server's certificate indicates the authority from which the certificate was obtained (the "issuer") Web browsers typically have a list of issuers that they trust. When a web browser is presented with a certificate from a web server, the browser will check the issuer and match it against its trusted list. If a match is found, the connection will continue; if a match is not found, the browser usually will present a warning and perhaps reject the connection. A CA is not necessarily a special entity other than the fact that it is trusted. Any entity can set itself up to trust, or sign, certificates. A certificate can trust itself, which is referred to as a self-signed certificate. To interoperate with a client using SSL/TLS, it is necessary to create certificates that the client will implicitly trust. With respect to a network appliance (as described below), it is presumed that an administrator can configure enterprise clients to trust the appliance to sign certificates. In effect, the issuer of the appliance then is on the browser's list of trusted issuers.

Network-Connected Secure Appliances

A network appliance typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk. No users, including administrative users, can access any data on physical disk. In particular, preferably the operating system (e.g., Linux) locks down the root account and does not provide a command shell, and the user does not have file system access. Typically, the appliance does not include a display device, a CD or other optical drive, or any USB, Firewire or other ports to enable devices to be connected thereto. It is designed to be a sealed and secure environment with limited accessibility and then only be authenticated and authorized individuals.

Figure 3:
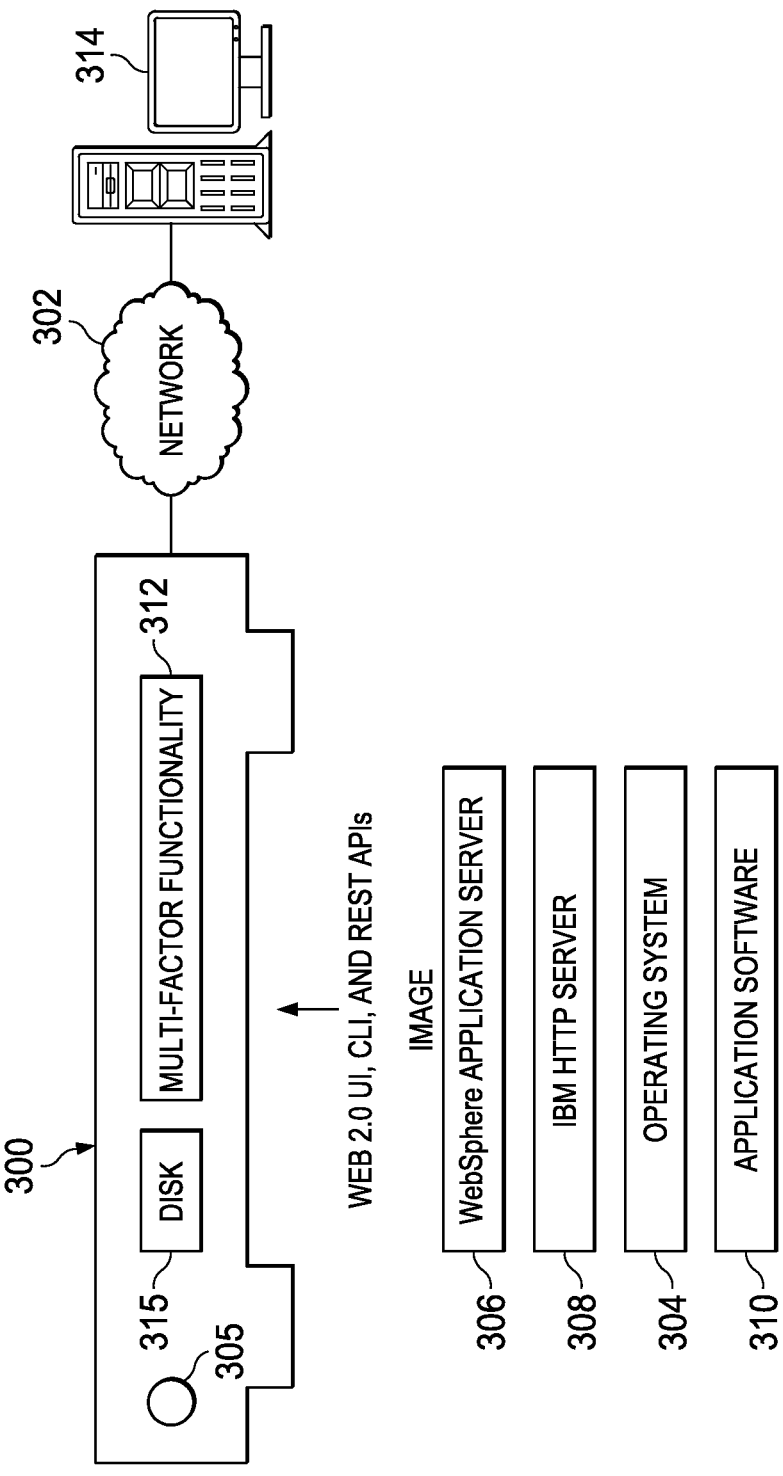
FIG. 3 illustrates an exemplary network-based secure appliance in which the disclosed subject matter may be implemented.

Referring to FIG. 3, a representative operating environment includes the physical appliance 300, which interfaces to a network 302. The appliance may be implemented using a data processing system such as described above with respect to FIG. 2, and it may represent one of the servers (or clients) shown in FIG. 1. Typically, the appliance 300 includes a Web 2.0-based user interface (UI), a command line interface (CLI), and REST-based application programming interfaces (APIs). In this example, the appliance has been provisioned with an image comprising an operating system 304, an application server 306, an HTTP server 308, and other application programs 310. Additional software solutions (not shown) may be included within the image. These software elements may come pre-loaded on the appliance, which may include other data (e.g., templates, scripts, files, etc.). The particular software configuration of course will depend on the use being made of the appliance. The appliance includes one of more storage devices (e.g., disk 315). The type and number of storage devices may vary.

Interception, Decryption and Inspection of Secure Network Communications

Figure 4:
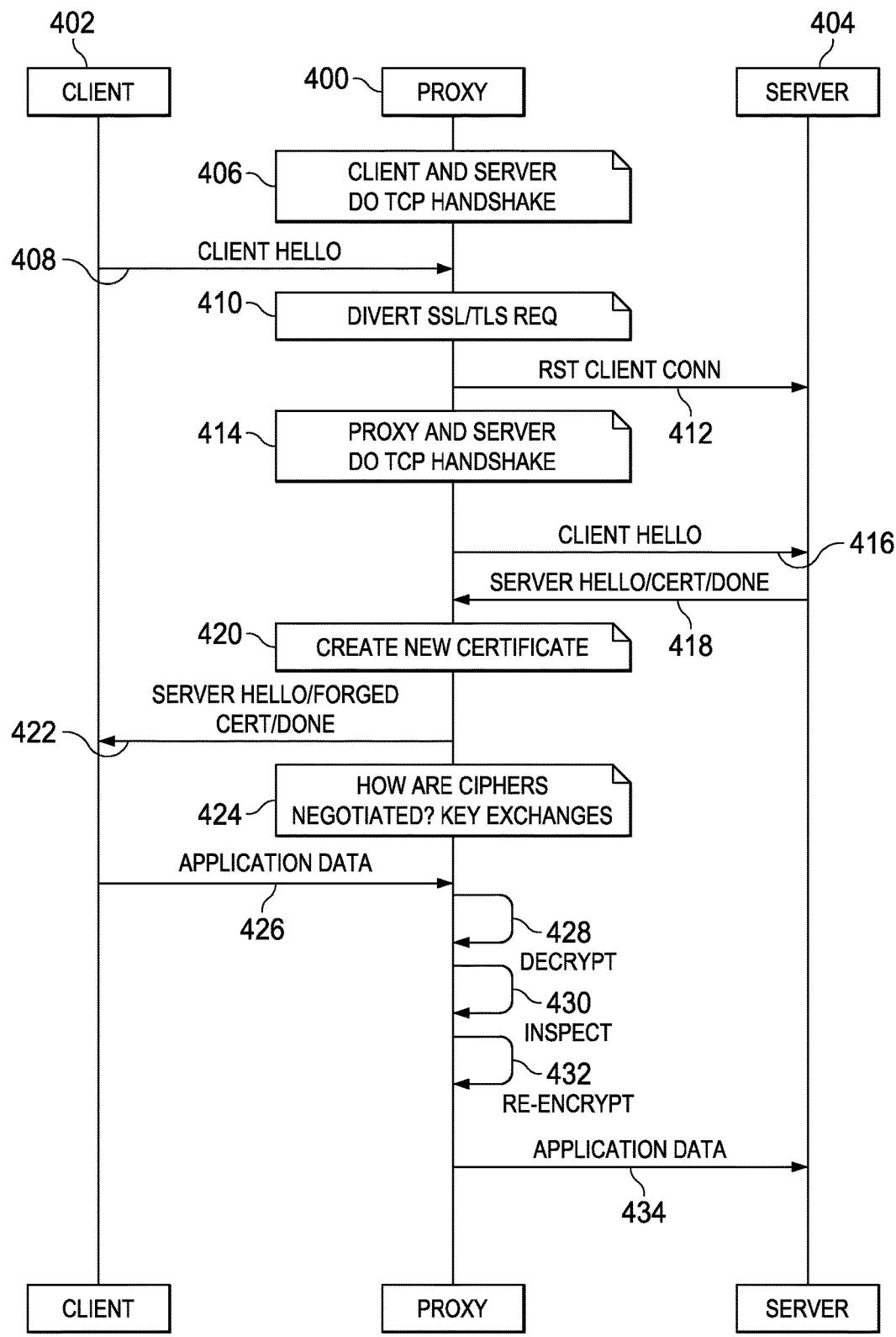
FIG. 4 illustrates how an SSL/TLS communication is diverted by the proxy of this disclosure to facilitate inspection of secure traffic.

FIG. 4 illustrates the basic operation of a device 400 for intercepting, decrypting and inspecting secure network communications according to this disclosure. Preferably, the device is implemented within a secure network appliance such as described above and illustrated in FIG. 3. More generally, the device is a computing system such as shown in FIG. 1.

As illustrated, the device 400 is connected between a client 402 and a server 404. The client and server are provisioned to secure communications using SSL or TLS. Familiarity with SSL/TLS is presumed. Generally, the device 400 provides a transparent (or man-in-the-middle) proxy between the client 402 and the server 404 by creating and managing two (2) separate SSL/TLS sessions, one as a client process to the target server 404, and another as a server process to the initiating client 402. The intermediate proxy 400 thus appears to the server 404 as a client, and to the client 402 as the intended server. Communications initiated from the client 402, and any responses received from the server 404, are then available for inspection and subsequent action. To that end, and as will be described in more detail below, proxy device 400 of this disclosure includes a protocol analysis module (e.g., IBM Security Network Protection PAM), which provides a packet inspection function to identify and possibly mitigate network threats. The particular details of the module are not an aspect of this disclosure.

As noted above, conventional man-in-the-middle (MITM) transparent proxies, being destination port-based, operate on the first packet they receive (typically the first TCP SYN packet, provided it is directed to the port being monitored). The device of this disclosure, in contrast, is designed to operate by identifying the SSL/TLS initiation on any network communications, without regard to the destination port. Thus, and as seen in FIG. 4, the client 402 and server 404 perform the initial TCP handshake at step 406. This handshake involves three (3) packets, the initial SYN from the client, the ACK returned by the server, and the SYN ACK reply from the client. In other words, the initial TCP handshake at step 406 involves three packets, and thus the technique of this disclosure is designed to begin on the fourth ($4^{th}$) packet, which is the SSL/TLS session initiation request (the Client Hello) transmitted by the client to begin the SSL/TLS handshake. This is step 408. According to this disclosure, the proxy intercepts the packet irrespective of the destination port. At step 410, the proxy diverts the SSL/TLS session initiation request message to the operating system (OS) kernel and in a manner that is transparent to the client. As will be described in more detail below, the operating system then establishes a "fake" or dummy socket to a local process to which the proxy itself is listening. In this manner, the SSL/TLS session initiation request (the Client Hello packet) is diverted from its initial path (intended for the target server 404) and, in effect, it is trapped by the proxy 400. Returning back to FIG. 4, at step 412 the proxy 400 then resets the client connection to the target server 404 (as otherwise the server would be waiting for a next packet); upon receipt of the reset message, the server 404 considers that the original connection (as evidenced by the three (3) TCP packets) has been dropped.

At step 414, the proxy 400 and the server 404 undertake a new TCP handshake. The proxy 400 then initiates the SSL/TLS session to the server 404 by issuing its own Client Hello message, which as noted acts as the session initialization request. This is step 416. At step 418, the server 404 responds with the Server Hello message (the SSL/TLS session initiation response) that includes the server's public key certificate. At step 420, the proxy 400 then creates a new server certificate, preferably as follows. In particular, the proxy 400 extracts relevant subject information from the certificate received from the server; the proxy then creates a public/private key pair and a new public key certificate. The new public key certificate created by the proxy includes the subject information extracted from the target server certificate, together with the newly-created (by the proxy) public key. The new certificate created by the proxy is then signed, preferably with a self-signed Certificate Authority (CA) certificate. The result, which is sometimes referred to herein as a "forged" certificate, is then returned from the proxy 400 to the client 402, together with a Server Hello message. This is step 422, and the Server Hello message here responds to the original Client Hello message initiated (at step 408) by the client 402. In other words, the new public key certificate created by the proxy is returned to the client as a response to the original SSL/TLS session initiation request. As step 424, the client and the proxy exchange messages and keys to establish the SSL session in the usual manner. Once the session is established, the client 402 sends application data. This is step 426, and the nature of the application data will depend on the application function. Because the proxy is now acting as a trusted intermediary, however, it intercepts the application data at step 428, decrypts it at step 430, and then performs a packet inspection at step 432. The nature of the inspection will depend on the local resources supported in the proxy. Preferably, the proxy operates a packet inspection and analysis component, which operates to analyze the network traffic to determine whether it represents any threat to the server (or other endpoint). Once the inspection is complete (and assuming no attack is detected), the proxy 400 re-encrypts the application data packet(s) at step 434 and, at step 436, sends those packets to the target server 404. This completes the process.

Thus, and according to this disclosure, normal network traffic (i.e., from point A, through the device, to point B, via a single socket supported in the device) is allowed to flow straight through. For secure traffic, however, the proxy breaks apart and re-assembles both sides of the communication. As described above, the client-facing side is treated different from the server-facing side. In essence, for each every single SSL/TLS connection that is desired to be inspected, the proxy creates two. Thus, when a client initially creates an HTTPS connection to a web server, it starts out as a TCP connection. This occurs normally. For an outbound connection, the client instantiates an SSL/TLS connection by sending (to the server) the Client Hello (the session initiation request message); as noted, this occurs over the established TCP connection. When this message hits the appliance, and as will be further described below, the device checks to see if there is a match against a rule that indicates SSL/TLS connections are to be checked for the IP address from which the message originates. If so, the appliance holds that session initiation request, not letting it continue on its way yet. Rather, the device pretends (with respect to the requesting client) to be the target web server when talking to the client from this point. To do so, the appliance needs to learn more about that server. Because the appliance has gathered some information from the incoming client connection, it can setup a server-facing connection (to the target server) and then pretend (with respect to that server) to be the client. To that end, the proxy creates a new connection that looks like the original client connection and send its own SSL/TLS Client Hello to the server. The server obliges by establishing a connection with the proxy, returning information including the server's certificate. This information is then used by the proxy to finish talking to the client. In particular, the proxy creates its own certificate (using some of the information from the server-supplied certificate), and then signs it. Because the client has been told that the appliance is trustworthy, the original client-facing connection is then completed (without the client being aware that the proxy is acting). The requesting client and the target server now each believe they have simply established an encrypted conversation with each other. As each side communicates, the proxy decrypts, inspects the data, and (assuming nothing bad is detected), re-encrypts and sends the data on its way.

The following describes the functionality in additional detail.

Figure 5:
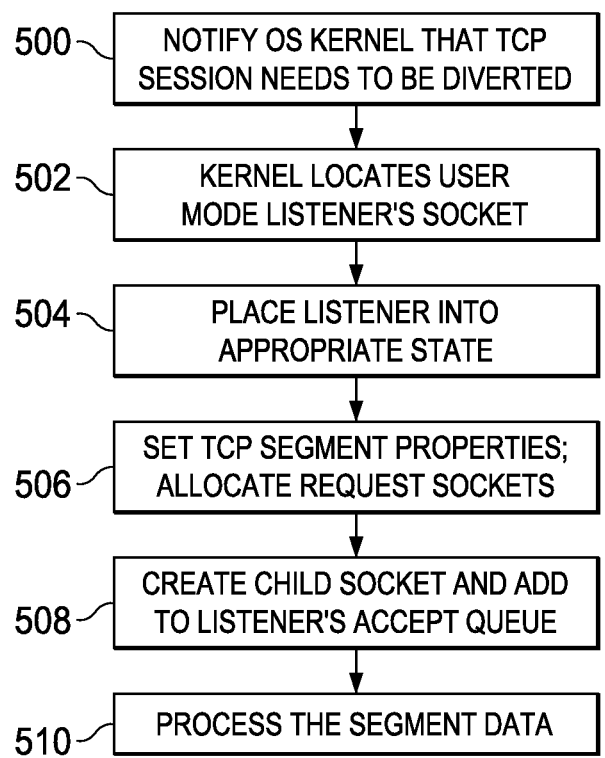
FIG. 5 is a process flow describing how the proxy interacts with local operating system kernel resources to facilitate the diversion by setting up two (2) distinct connections, one that is client-facing, and the other server-facing.

In particular, the above describes the notion of how the TCP connection between the requesting client and the target server is diverted, following by the creation of two connections, one between the client and the appliance, and the other between the appliance and the server. To provide this functionality, the appliance implements an operating system (OS) kernel device driver, preferably according to the following assumptions: (1) a user mode process is active and has created an appropriate socket to accept a connection from a client; (2) the user mode process has indicated a willingness to accept connections on the socket associated with a well-known port that has been agreed-upon by both the kernel and the user mode process; and (3) the user mode process will indicate to the kernel when the current TCP connection between the client and the server is diverted to the user mode process. From a high level, the basic processing is then as shown in the process flow in FIG. 5. Preferably, this processing is carried out using the kernel device driver, sometimes referred to as a frame capture ("frmcap") module. At step 500, the user mode notifies the operating system kernel that a TCP session needs to be diverted. At step 502, the kernel locates the user mode listener's socket. At step 504, the module ensures that the listener is in an appropriate state such that it is able to accept new data. At step 506, TCP segment properties are set, and a request socket is allocated and initialized. At step 508, a child of the listener's socket is created, and the child is added to an accept queue associated with the listener's socket. The routine then continues at step 510 to process the segment data.

The following provides still further additional details regarding the above-described operations. The reader's familiarity with Linux operating system (OS) kernel functionality is now presumed in the following discussion.

Thus, the initial diversion of the TCP/IP session is initiated by a user mode process when the network payload has been processed and is ready to be sent out of the appliance. For an appliance that is using the frame capture for acquiring network packets, the frame preferably is marked prior to being placed on an egress queue by a user mode process. Along with the initiation of the diversion, the user mode request preferably supplies additional information that is used by the kernel, such as the port to be used to locate the listener, the maximum segment size (MSS) to be used when creating a new socket, an indication that SYN/ACK (SACK) was seen on the SYN packet from the client, the window scaling that was received from the client, an indication that the window scaling was seen on the SYN packet from the client, and the window scaling that was received from the server. Default values may be assumed by the kernel if the above values are not provided in whole or in part. The listener's socket is located, preferably using the kernel's standard lookup functions, which typically return a null response if the listener cannot be located. The port used for the lookup is supplied by user mode code when then kernel is notified of initiate the diversion. The state of the user mode listener socket is checked to ensure that it is able to receive the data that is being diverted. The conditions for the listener must that the listener is in a TCP_LISTEN state, and the accept queue for the listener must not be full. The TCP segment properties include the TCP control block, which is initialized from values that are contained in both the IP and TCP headers. Specifically, the set of needed TCP sequence numbers are computed and stored for later use by the kernel's network stack. The request socket is created, and preferably both an INET and TCP request socket are derived. Values within both request sockets are then initialized from values contained with both the IP and TCP headers associated with the network data that is being diverted. Once the request, INET request and TCP request sockets are created and initialized, the child socket (of the listener) is created by invoking the appropriate syn_recv_sock (_) function based on the listener's INET connection (IPv4 or IPv6). The newly-created child socket is then placed on the accept queue of the listening socket by the invocation of the inet_csk_reqsk_queue_add (_) function. The kernel buffer (skbuff) that contains the network data that is to be diverted is then processed by invoking the tcp_child_process (_) function; this moves the child socket to an ESTABLISHED state, wakes-up the listener, and adds the contents of the skbuff to the receive buffer of the child socket.

Figure 6:
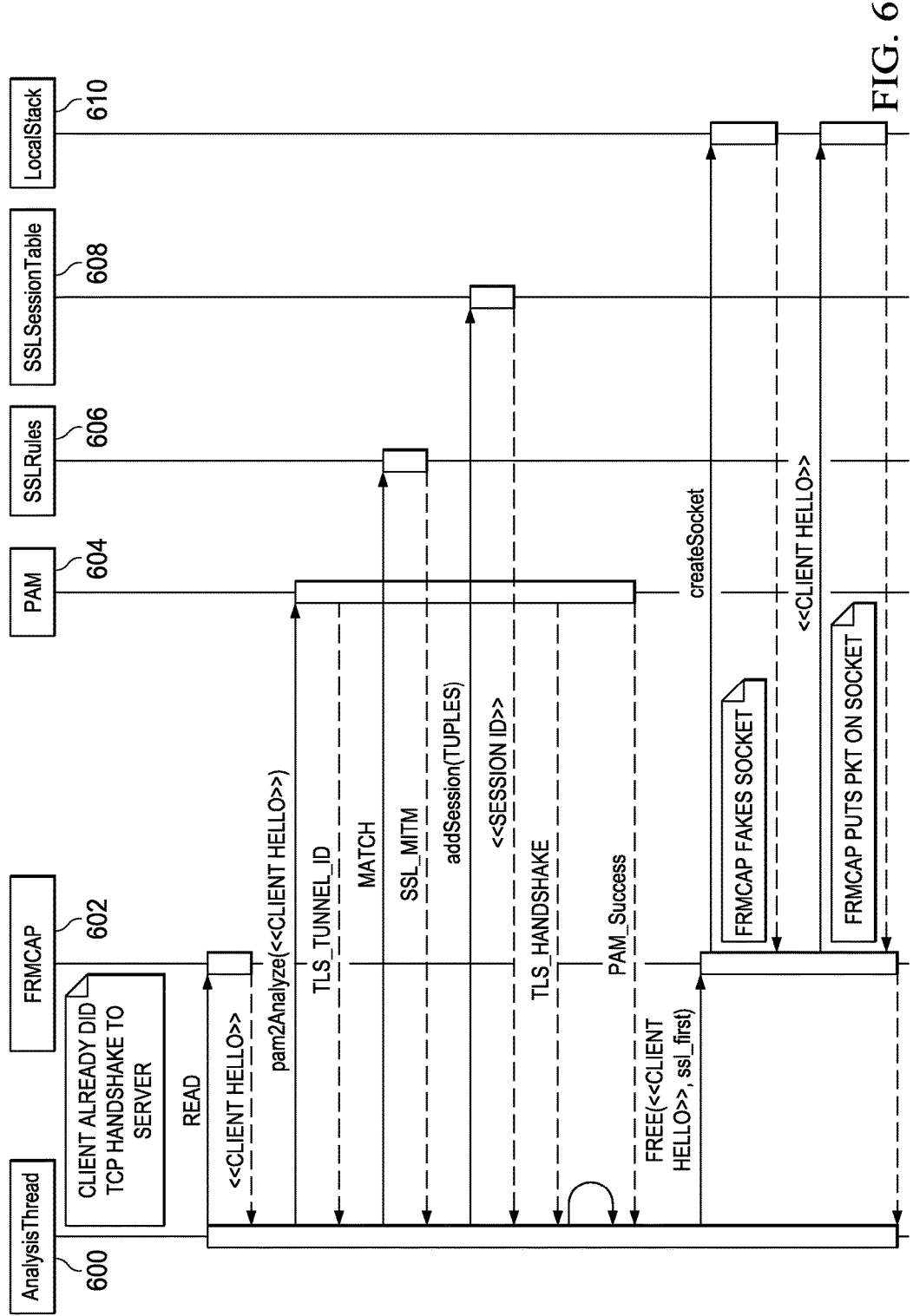
FIG. 6 illustrates the SSL/TLS diversion process in additional detail from the perspective of the client-facing connection.

FIG. 6 illustrates the client-facing side of the interception process described above. In one preferred embodiment, there are several software modules that execute in the secure network appliance to facilitate the above-described processing. These modules include an analysis thread 600 that manages the basic high level message handling. The frame capture device driver (Frmcap) 602 runs as an operating system (OS) kernel module. The actual inspection of the data (following decryption) is performed by a packet analysis module (PAM) 604, which executes various heuristics to analyze packets for one or more network threats. In this embodiment, PAM 604 also provides the mechanism by which the system checks to determine (using a match table) whether a particular SSL/TLS communication is to be inspected. An SSL rules module 606 includes a set of one or more configurable rules that determine when to initiate the processing. An SSL Session Table process 608 maintains in-memory data identifying active SSL sessions being managed by the device. The Local Stack process 610 is the listener thread to which the proxy listens for new work. The various messages that are processed by these modules, together with their interactions, are illustrated. The createSocket (_) function is the main processing, as this operation creates a fake or dummy socket and diverts the SSL/TLS packet (the Client Hello, which is the fourth frame received) to the local stack, where it can be picked up and processed. One or more of the modules illustrated may be combined or integrated together.

Figure 7A:
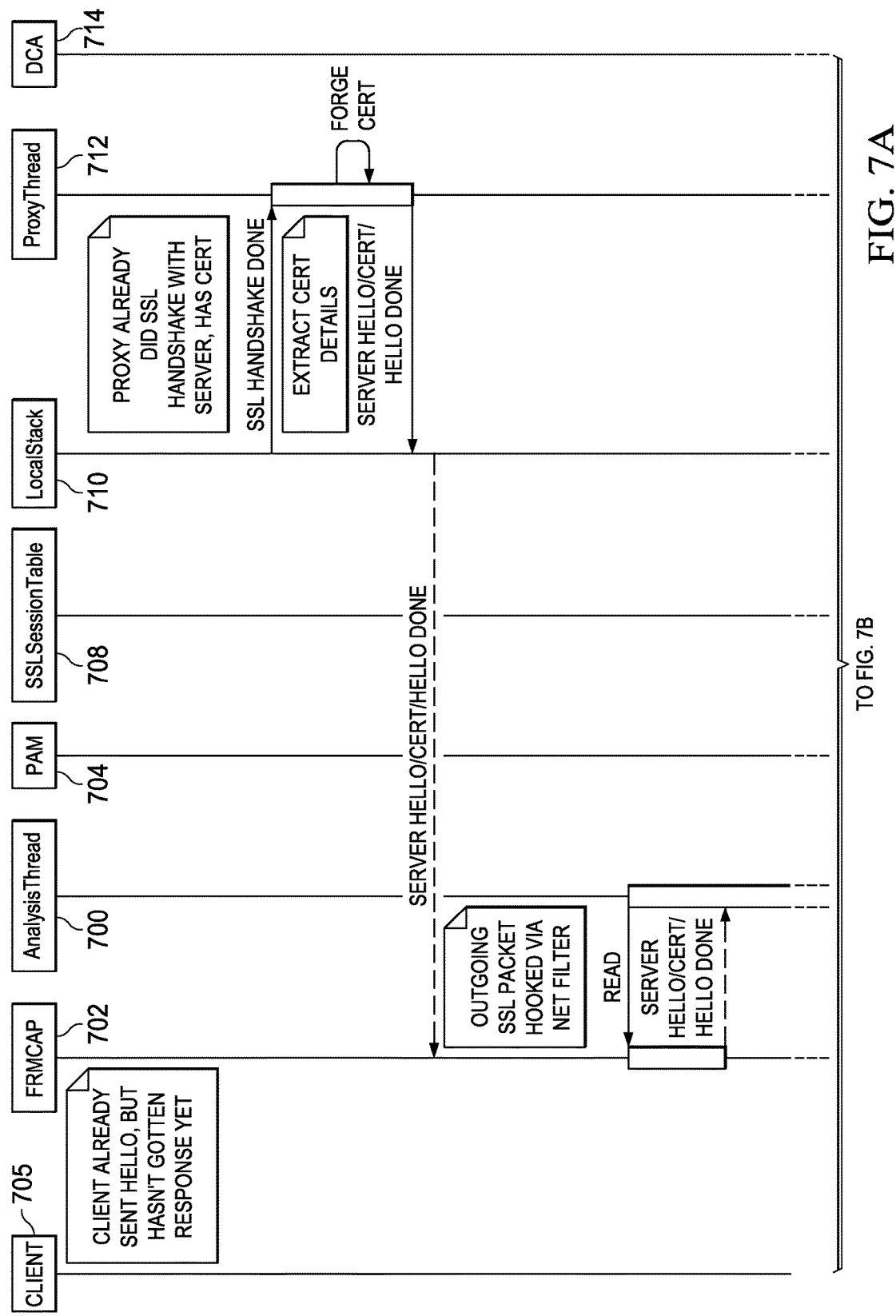
FIG. 7A-7B illustrates the details of the server-facing connection.
Figure 7B:
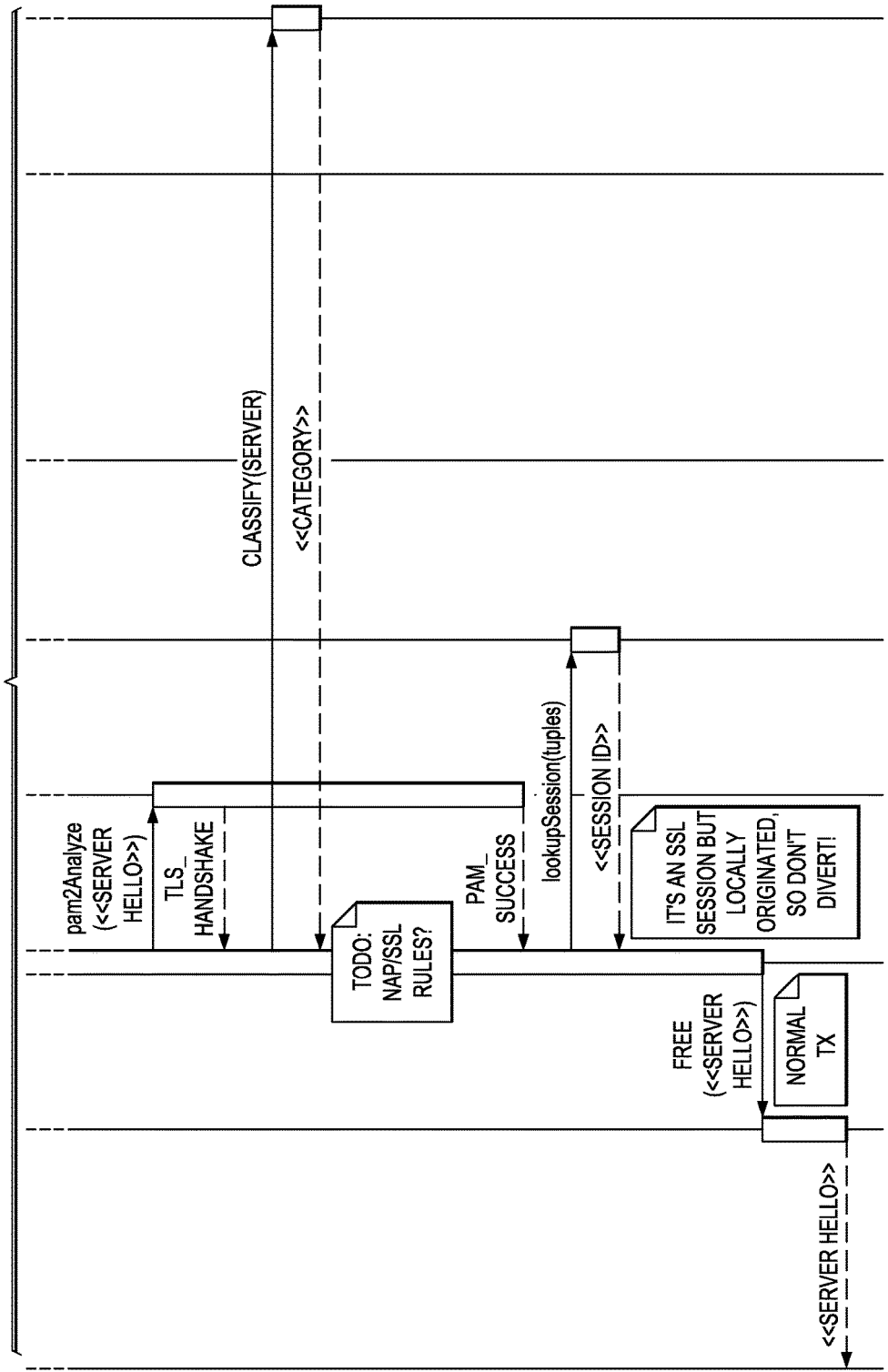

FIG. 7A-7B illustrates the server-facing portion of the connection. Here, the frame capture module is reference element 702, which corresponds to reference element 602 in FIG. 6. The analysis thread 700, PAM 704, SSL Session Table 708 and Local Stack 710, are also shown. These correspond to their counterparts in FIG. 6. In this drawing, several additional elements are also shown, primarily a Proxy Thread 712, which generates the Server Hello (and its dummy certificate). As can be seen in the bottom half portion, the frame capture, analysis thread and PAM modules perform additional processing on the Server Hello message that is generated by the Proxy Thread to confirm that the SSL session being created is locally-originated and thus should not be re-diverted again. Without this function, the diversion would occur again. During this checking, the analysis thread may interact with a database 714.

The above-described approach provides many advantages. Current MITM systems are bound to specific IP ports and thus have the ability to act only on communications destined for those ports. The subject technique, in contrast, operates by identifying the SSL/TLS initiation on any network communications, and without regard to destination port. In this way, an implementation based on the described diversion technique is capable of acting as MITM for any SSL/TLS communication. The approach integrates tightly with the host operating system's network components in the kernel, preferably (as described) by cloning the network connection of the inbound (client-facing) connection originally destined for the target server, and then forwarding it to the system after the initial SSL/TLS handshake has been completed. This enables the system to become the termination point for the client-side SSL/TLS connection. After the client-side SSL/TLS connection has been established with the MITM, the system establishes a new session with the target server by sending a new session request and receiving the necessary information (the server credential) to enable the system to build its own credential, which is then passed back to the requesting client to complete (from the client's perspective) the initial SSL/TLS connection setup. At this point the system can passively observe the network traffic (intercepting, decrypting, inspecting and re-encrypting, all with permission as a trusted entity). The approach relies upon distribution of the MITM's CA certificate to the requesting client (and other like participating clients) to avoid browser warnings of certificate mismatch. The communications between client and server, now decrypted at the MITM, are processed by an inspection engine to identify network threats in either direction, and to act on such threats according to the inspection engine's policy.

While a preferred operating environment and use case (a secure appliance) has been described, the techniques herein may be used in any other operating environment in which it is desired to intercept, decrypt and inspect network traffic to and/or from a computing system or device.

As has been described, the functionality described above may be implemented as a standalone approach, e.g., a software-based function executed by a processor, or it may be available as a service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various client-side architectures (e.g., firewalls, NAT devices), and in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the interfaces and utility are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The appliance is not limited to any particular type of appliance. The above-described operation may likewise be used to intercept, decrypt, inspect and re-encrypt data from any machine, irrespective of the machine's physical configuration.

The techniques herein generally provide for the above-described improvements to a technology or technical field, as well as the specific technological improvements to network-connected secure appliances, such as described above.

Having described our invention, what we now claim is as follows.

The invention claimed is:

1. A method, comprising:
responsive to detection of a session initiation request message from a client and intended for a server, holding the session initiation request message locally, the session initiation request message being received following establishment of a Transmission Control Protocol (TCP) connection between the client and the server;
while continuing to hold the session initiation request message locally, resetting the TCP connection between the client and the server, initiating a new TCP connection to the server, and sending a new session initiation request message to the server over the new TCP connection, the new session initiation request message not including the session initiation request message received from the client;
receiving, from the server, a response to the new session initiation request message, the received response including a server certificate;
using information in at least the server certificate to generate a new server certificate; and
forwarding, to the client, a response to the session initiation request message that was being held locally, the forwarded response including the new server certificate;
wherein each operation is carried out in software executing in a hardware element.

2. The method as described in claim 1 wherein the step of holding the session initiation request message locally includes:
creating a socket to a local process; and
diverting the session initiation request message to the local process over the socket.

3. The method as described in claim 2 wherein the local process is a user mode local process having an associated listener, and the socket is created by an operating system kernel.

4. The method as described in claim 3 wherein the step of diverting the session initiation request message to the local process includes:
creating a child socket associated with the listener; and
adding the child socket to a queue associated with the listener.

5. The method as described in claim 1 wherein the new server certificate is generated by:
extracting subject information from the server certificate;
creating a key pair and a public key certificate, the public key certificate including the subject information, together with a public key of the key pair; and
signing the public key certificate with a self-signed certificate.

6. The method as described in claim 1, further including:
intercepting a data packet received from the client;
decrypting the data packet to recover given data;
inspecting the given data;

re-encrypting the given data to generate a new data packet; and forwarding the new data packet to the server.

7. The method as described in claim 1, wherein the session initiation request message is one of: a Secure Sockets Layer (SSL) client hello, and a Transport Layer Security (TLS) client hello, and the TCP connection is not bound to a dedicated port.

8. Apparatus, comprising:

a processor;

computer memory holding computer program instructions executed by the processor, the computer program instructions comprising:

program code, responsive to detection of a session initiation request message from a client and intended for a server, to hold the session initiation request message locally, the session initiation request message being received following establishment of a Transmission Control Protocol (TCP) connection between the client and the server;

program code, operative while holding the session initiation request message locally, to reset the TCP connection between the client and the server, to initiate a new TCP connection to the server, and to send a new session initiation request message to the server over the new TCP connection, the new session initiation request message not including the session initiation request message received from the client;

program code operative to receive, from the server, a response to the new session initiation request message, the received response including a server certificate;

program code operative to use information in at least the server certificate to generate a new server certificate; and program code operative to forward, to the client, a response to the session initiation request message that was being held locally, the forwarded response including the new server certificate.

9. The apparatus as described in claim 8 wherein the program code to hold the session initiation request message locally includes:

program code operative to create a socket to a local process; and program code operative to divert the session initiation request message to the local process over the socket.

10. The apparatus as described in claim 9 wherein the local process is a user mode local process having an associated listener, and the socket is created by an operating system kernel.

11. The apparatus as described in claim 10 wherein the program code operative to divert the session initiation request message to the local process includes:

program code operative to create a child socket associated with the listener; and program code operative to add the child socket to a queue associated with the listener.

12. The apparatus as described in claim 8 wherein the program code operative to generate the new server certificate includes:

program code operative to extract subject information from the server certificate;

program code operative to create a key pair and a public key certificate, the public key certificate including the subject information, together with a public key of the key pair; and program code to sign the public key certificate with a self-signed certificate.

13. The apparatus as described in claim 8, further including:

program code operative to intercept a data packet received from the client;

program code operative to decrypt the data packet to recover given data;

program code operative to inspect the given data;

program code operative to re-encrypt the given data to generate a new data packet; and program code operative to forward the new data packet to the server.

14. The apparatus as described in claim 8, wherein the session initiation request message is one of: a Secure Sockets Layer (SSL) client hello, and a Transport Layer Security (TLS) client hello, and the TCP connection is not bound to a dedicated port.

15. A computer program product in a non-transitory computer readable medium for use in a data processing system, the computer program product holding computer program instructions which, when executed by the data processing system, perform a set of operations, the computer program instructions comprising:

program code, responsive to detection of a session initiation request message from a client and intended for a server, to hold the session initiation request message locally, the session initiation request message being received following establishment of a Transmission Control Protocol (TCP) connection between the client and the server;

program code, operative while holding the session initiation request message locally, to reset the TCP connection between the client and the server, to initiate a new TCP connection to the server, and to send a new session initiation request message to the server over the new TCP connection, the new session initiation request message not including the session initiation request message received from the client;

program code operative to receive, from the server, a response to the new session initiation request message, the received response including a server certificate;

program code operative to use information in at least the server certificate to generate a new server certificate; and program code operative to forward, to the client, a response to the session initiation request message that was being held locally, the forwarded response including the new server certificate.

16. The computer program product as described in claim 15 wherein the program code to hold the session initiation request message locally includes:

program code operative to create a socket to a local process; and program code operative to divert the session initiation request message to the local process over the socket.

17. The computer program product as described in claim 16 wherein the local process is a user mode local process having an associated listener, and the socket is created by an operating system kernel.

18. The computer program product as described in claim 17 wherein the program code operative to divert the session initiation request message to the local process includes:

program code operative to create a child socket associated with the listener; and program code operative to add the child socket to a queue associated with the listener.

19. The computer program product as described in claim 15 wherein the program code operative to generate the new server certificate includes:

program code operative to extract subject information from the server certificate;

program code operative to create a key pair and a public key certificate, the public key certificate including the subject information, together with a public key of the key pair; and program code to sign the public key certificate with a self-signed certificate.

20. The computer program product as described in claim 15, further including:

program code operative to intercept a data packet received from the client;

program code operative to decrypt the data packet to recover given data;

program code operative to inspect the given data;

program code operative to re-encrypt the given data to generate a new data packet; and program code operative to forward the new data packet to the server.

21. The computer program product as described in claim 15, wherein the session initiation request message is one of: a Secure Sockets Layer (SSL) client hello, and a Transport Layer Security (TLS) client hello, and the TCP connection is not bound to a dedicated port.

22. Apparatus, comprising:

a hardware processor;

computer memory storing an operating system kernel, the operating system kernel including software to provide outbound Secure Sockets Layer (SSL)/Transport Layer Security (TLS) processing by (i) detecting an SSL/TLS session initiation request message from a client and intended for a server, the session initiation request message being received following establishment of a Transmission Control Protocol (TCP) connection between the client and the server, (ii) creating a fake socket to a local process; (iii) diverting the session initiation request message to the local process over the fake socket; (iv) resetting the TCP connection, initiating a new TCP connection to the server, and sending a new session initiation request message to the server over the new TCP connection, the new session initiation request message not including the session initiation request message received from the client; (v) receiving, from the server, a response to the new session initiation request message, the received response including a server certificate; (vi) using information in at least the server certificate to generate a new server certificate; and (vii) forwarding, to the client, a response to the session initiation request message that was diverted to the local process, the forwarded response including the new server certificate.

23. The apparatus as described in claim 22 wherein the software further includes:

program code operative to intercept a data packet received from the client;

program code operative to decrypt the data packet to recover given data;

program code operative to inspect the given data;

program code operative to selectively re-encrypt the given data to generate a new data packet; and program code operative to forward the new data packet to the server.

24. The apparatus as described in claim 23 wherein the given data is inspected by an inspection engine according to a policy.

25. The apparatus as described in claim 22 wherein the operating system kernel is Linux.

\* \* \* \* \*